United States Patent [19]
Shirakawa

[11] Patent Number: 5,379,494
[45] Date of Patent: Jan. 10, 1995

[54] BINDER FOR BUNDLING ELECTRIC WIRES OR THE LIKE

[75] Inventor: Yuji Shirakawa, Tokyo, Japan

[73] Assignee: Nirei Industry Co., Ltd., Tokyo, Japan

[21] Appl. No.: 3,746

[22] Filed: Jan. 13, 1993

[30] Foreign Application Priority Data

Jun. 26, 1992 [JP] Japan ............................. 4-051069[U]

[51] Int. Cl.⁶ ............................................ B65D 63/10
[52] U.S. Cl. ............................. 24/168 PB; 24/30.5 P
[58] Field of Search ............... 24/16 R, 16 PB, 17 AP, 24/30.5 P

[56] References Cited

U.S. PATENT DOCUMENTS 3,872,547  3/1975  Caveney et al. ................. 24/16 PB
4,680,834  7/1987  Andre et al. .
4,763,700  8/1988  Hidaka et al. .

FOREIGN PATENT DOCUMENTS 2-29286  4/1987  Japan .

Primary Examiner—James R. Brittain
Attorney, Agent, or Firm—Oliff & Berridge

[57] ABSTRACT

Disclosed is a binder for bundling electric wires or the like, which comprises a long bundling band of synthetic resin which is to be wound like a loop around objects to be bundled such as electric wires or the like to thereby bundle the objects and which has on its surface a plurality of convex-concave portions formed so as to be lake a rack, and a stopper of synthetic resin having a box-like opening portion through which two portions of the bundling band can be inserted with the respective back surfaces of the two portions put on each other, and further having a pair of pawl members formed on the inner opposite walls of the opening portion for engaging with the convex-concave portions of the bundling band inserted through the opening portion, wherein substantially intermediate portions of the pair of pawl members are connected to the inner opposite walls of the box-like opening portion respectively, at least one pawl portion is formed at a top end of each of the pair of pawl members so as to engage with the convex-concave portion of the rack-shaped bundling band, and a space is formed between a leg portion of the other end of each of the pawl members and the inner wall corresponding to tile pawl member so as to allow the pawl member to turn in the space.

4 Claims, 5 Drawing Sheets

BINDER FOR BUNDLING ELECTRIC WIRES OR THE LIKE

BACKGROUND OF THE INVENTION

1. Field of the Invention

The present invention relates to binders for bundling electric wires or the like, and particularly relates to a binder for bundling electric wires or the like and constituted by a combination of a rack-shaped bundling band having a plurality of convex-concave portions, and a stopper provided with a pair of pawl members for engaging with the above-mentioned convex-concave portions, the stopper having a special structure to thereby ensure the engagement with the bundling band.

2. Description of the Related Art

As such a binder, the present inventor has proposed that disclosed in Japanese Utility Model Postexamination Publication No. Hei-2-29286, in which a stopper is provided with a pair of pawl members formed on inner opposite walls of a square-cylindrical box-like opening portion.

The above stopper is however configured so that one end of each of the pawl members of the stopper is coupled with the inner wall of the square-cylindrical box-like opening portion, while the other end of the pawl member engages with a convex-concave portion of a rack-shaped bundling band. Accordingly, each pawl member is apt to incline in the direction of disengagement when the bundling band is tightened strongly, and if a large load is given to the bundling band, the engagement between each pawl member and the convex-concave portion is released before the bundling band or the box-like opening portion of the stopper is broken off. Thus, there has been a problem in mechanical strength.

Further, it is preferable to make the distance between the respective top end portions of the pair of pawl members is made larger in view of working for insertion of one end of the bundling band into the box-like opening portion at the time of bundling working. In order to ensure the engagement between the pawl members and the convex-concave portions of the bundling band, on the contrary, it is necessary to make the distance between the top end portions of the pair of pawl members as small as possible in advance. Since such antinomic conditions cannot be satisfied at the same time, however, there has been a problem that if sure engagement is intended, the convex-concave portions of the bundling band engage with the respective top ends of the pair of pawl members so that smooth operation of the insertion is made difficult when the bundling band is inserted into the opening portion, while if smooth working of inserting the bundling band is intended, the engagement is so insufficient that the bundling band comes out of the stopper.

SUMMARY OF THE INVENTION

In view of the above circumstances in the related art, it is an object of the present invention to provide a binder for bundling electric wires or the like, in which a bundling band can be inserted into a stopper easily on one hand, and the bundling band can be engaged with the stopper tightly at the time of bundling on the other.

In order to attain the above object, according to an aspect of the present invention, provided is a binder for bundling electric wires or the like, comprising: a long bundling band of synthetic resin which is to be wound like a loop around objects to be bundled such as electric wires or the like to thereby bundle the objects and which has on its surface a plurality of convex-concave portions formed so as to be like a rack; and a stopper of synthetic resin having a box-like opening portion through which two portions of the bundling band can be inserted with the respective back surfaces of the two portions put on each other, and further having a pair of pawl members formed on the inner opposite walls of the opening portion for engaging with the convex-concave portions of the bundling band inserted through the opening portion; wherein substantially intermediate portions of the pair of pawl members are connected to the inner opposite walls of the box-like opening portion respectively, respective top ends of the pair of pawl members are formed so as to engage with the convex-concave portions of the rack-shaped bundling band, and a space is formed between a leg portion of the other end of each of the pawl members and the inner wall corresponding to the pawl member so as to allow the pawl member to turn in the space.

Preferably, each of the respective top ends of the pair of pawl members has at least one pawl portion formed so as to engage with the convex-concave portions of the rack-shaped bundling band.

According to the above-mentioned configuration, one end portion of the bundling band is inserted through the box-like opening portion of the stopper, then the bundling band is wound like a loop around objects to be bundled such as electric wires or the like, and then the above-mentioned one end portion is inserted again into the opening portion in the direction reverse to the direction of insertion at the previous time to thereby make its convex-concave portion engage with the pawl portion of the top end of one of the pawl members of the stopper. Then, the other-end side of the bundling band is pulled to tighten the loop and a convex-concave portion of the bundling band is made to engage with the pawl portion of the top end of the other pawl member, and then an unnecessary portion of the bundling band projecting over the stopper is cut off to thereby complete the working of bundling.

In the above working of bundling, when the one end of the bundling band wound around objects to be bundled is inserted again into the opening portion, the insertion is performed in the state of the leg portion of the pawl member being widened or pushed outwards. Since the intermediate portion of the pawl member is connected to the inner wall of the opening portion, the pawl member turns when the leg portion is pushed outwards so that the pawl portion is pushed inwards down. Therefore, the pawl portion is pushed against the end portion of the bundling band inserted again more stronger so that the engagement therebetween becomes surer. Then, the bundling band is tightened so that the stopper and the objects to be bundled are made to be adjacent to each other and the distance between the two portions of the bundling band at the exit of the opening portion is widened so that the respective leg portions on the other ends of the pair of pawl members are also pushed outwards towards the inner walls of the opening portion. Thus, the pair of pawl members turn to make their pawl portions come close to each other so that the respective pawl portions of the pawl members are urged deeply against the convex-concave portions of the bundling band to thereby make the engagement between the pawl members and the bundling band stronger.

As has been described above, the bundling band wound around objects to be bundled is inserted again into the stopper and tightened so that the pawl members turn to fasten the engagement with the bundling band. Accordingly, it is not necessary to make the distance between the respective top end pawl portions of the pawl members small in advance. It is therefore possible to perform the working of inserting the bundling band into the box-like opening portion easily. Further, the more strongly the bundling band is tightened, the stronger the engagement between the pawl members and the bundling band is. It is therefore possible to bundle objects to be bundled surely and steadily.

Thus, according to the present invention, it is possible to satisfy the two antinomic conditions, which have been impossible to be realized, that is, easy working of inserting a bundling band into a stopper and sure engagement between the bundling band and the stopper, at the same time.

If the number of the pawl portions formed on each of the pawl members are increased, the engagement of the pawl members with the bundling band becomes stronger so that it is possible to bundle objects to be bundled more steadily.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

An embodiment of the present invention will be described with reference to the drawings.

Figure 1:
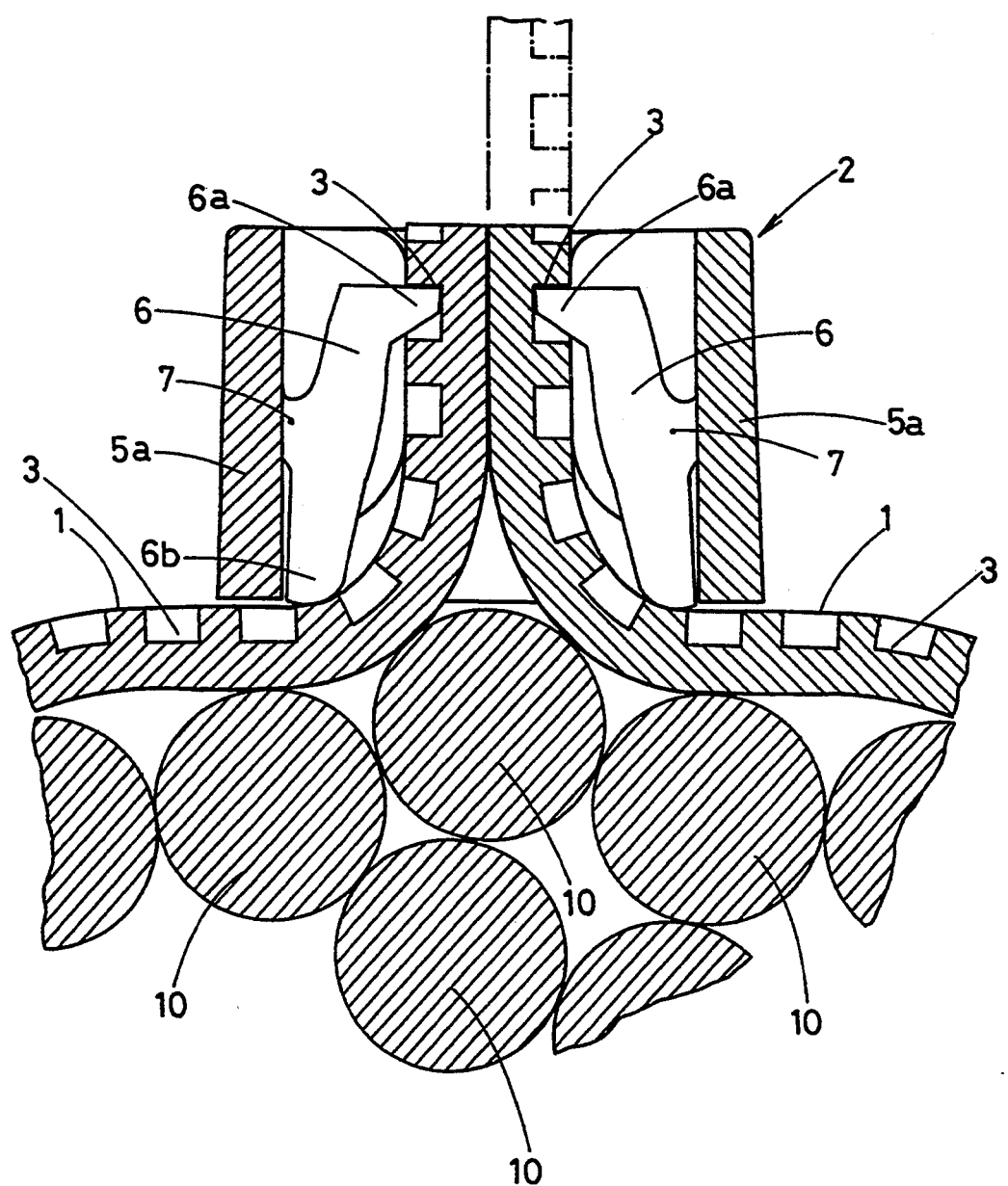
FIG. 1 is a sectional view illustrating a main portion of a binder for bundling electric wires or the like according to the present invention.

FIG. 1 shows an embodiment of the binder for bundling electric wires or the like according to the present invention. The binder according to the present invention is constituted by a combination of a bundling band 1 and a stopper 2 each of which is made of synthetic resin, and is used for bundling objects to be bundled 10, 10 . . . such as electric wires or the like.

Figure 2:
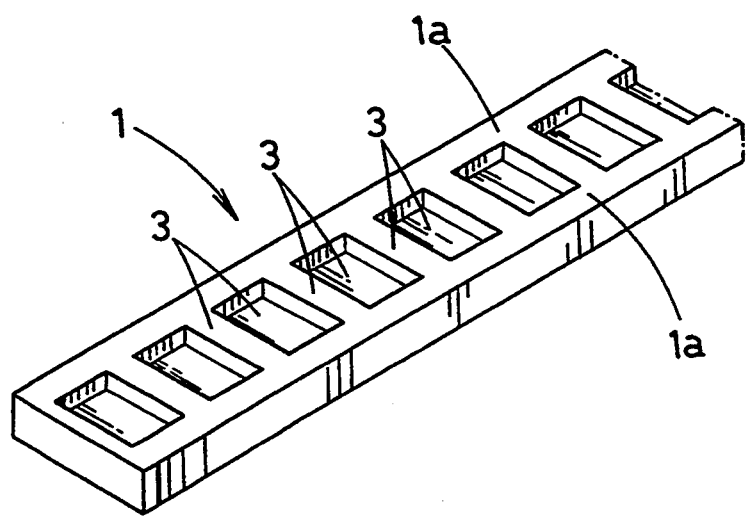
FIG. 2 is a perspective view illustrating the bundling band.

In use, the bundling band 1 is wound like a loop around objects to be bundled such as electric wires or the like. The bundling band 1 is produced in the form of a long rack-like member having a surface on which a plurality of convex-concave portions 3 are formed as shown in FIG. 2. Edges 1a and 1a at the opposite sides of the bundling band 1 are formed so as to be even to the upper surfaces of the convex-concave portions 3.

Figure 3:
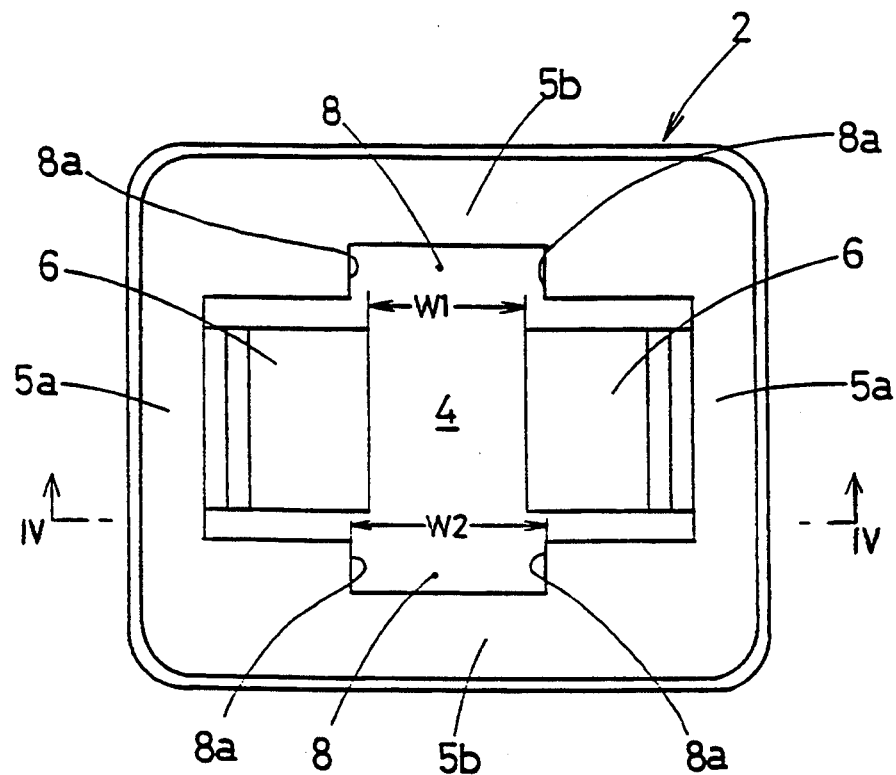
FIG. 3 is a plan view illustrating an embodiment of the stopper.
Figure 4:
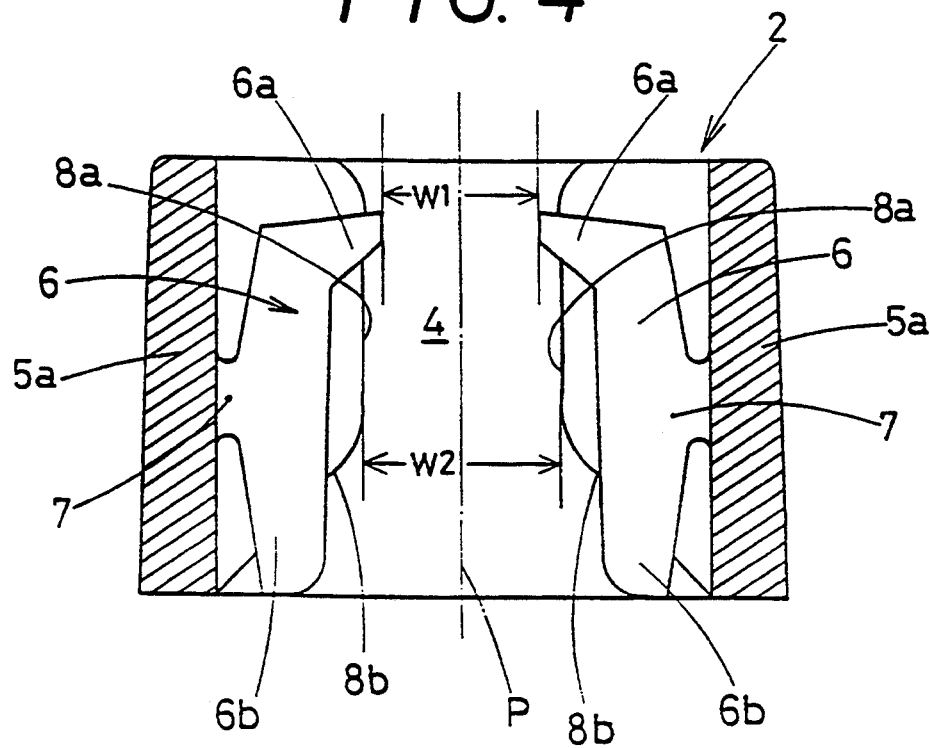
FIG. 4 is a sectional view taken on line X—X in FIG. 3.

As shown in FIGS. 3 and 4, the stopper 2 has a box-like opening portion 4 of a size to allow two portions of the bundling band 1 to pass through the opening portion at the same time in the state where the respective back surfaces of the two portions are put on the other. The stopper 2 further has a pair of pawl members 6 and 6 respectively formed on opposite walls 5a and 5a inside the opening portion 4 so that the pawl members 6 and 6 can engage with the convex-concave portions 3 of the bundling band 1 inserted into the opening portion 4.

The pawl members 6 and 6 are connected at their substantially intermediate portions to the opposite inner walls 5a and 5a of the box-like opening portion 4 through connecting portions 7 respectively. A pawl portion 6a is formed on the top end of each of the pawl members 6 and 6 so as to engage with any of the convex-concave portions 3 of the rack-shaped bundling band 1. The distance w1 between the pawl portions 6a is set so as to be larger than the thickness of the bundling band 1 but a little smaller than two times of the thickness of the bundling band 1. A space is formed between the leg portion 6b at the other end of each pawl member 6 and the corresponding inner wall 5a to an extent so that the other end of each pawl member 6 can turn outwards. The leg portion 6b of the pawl member 6 may project to the outside of the opening portion 4.

Guide grooves 8 and 8 are formed in another pair of opposite inner walls 5b and 5b of the opening portion 4 adjacent to the pair of opposite inner walls 5a and 5s so as to guide the opposite edges of the bundling band 1 inserted into the opening portion 4 so that the interface of the respective back surfaces of the two portions of the bundling band 1 put in contact with each other is made to come on a center axial line p of the opening portion 4. The distance w2 between guide surfaces 8a and 8a of each of the guide grooves 8 and 8 of the bundling band 1 on the pawl portion 6a sides is selected to be twice as large as the thickness of the bundling band 1. The other guide surfaces 8b and 8b of the guide grooves 8 and 8 are expanded so that they are away from each other. The pawl portions 6a of the respective pawl members 6 are formed so as to project slightly inwards beyond the guide surfaces 8a of the guide grooves 8 and 8.

The leg portions 6b of the pawl members 6 are formed to project beyond the lower guide surfaces 8b.

Now, referring to FIG. 5, the state of use of the binder having above configuration will be described. First, one end 1a of the bundling band 1 is inserted and passed, along the guide grooves 8, through the opening portion 4 of the stopper 2 along the guide grooves 8 as shown in the diagram (a) of FIG. 5, and then the bundling band 1 is wound into a loop around the electric wires 10, 10 . . . or the like as shown in the diagram (b) of FIG. 5. Then, the one end 1a of the bundling band 1 is inserted again, as shown in the diagram (c) of FIG. 5, into the opening portion 4 of the stopper 2 but in the direction reverse to the direction of insertion of the first time as shown in the diagram (a) of FIG. 5 so that the back surface of the bundling band 1 at the one end 1a is made to come into contact with the back surface of the same bundling band 1 at its other portion in opposition to the one end 1a to thereby make one convex-concave portion 3 of the bundling band 1 at its one end 1a is made to engage with the pawl portion 6a of one of the pawl members 6 (the left one in the diagram (c) of FIG. 5) which projects inwards beyond the guide surface 8a of the guide groove 8. Then, the other-end side of the bundling band 1 is pulled to tighten the loop so that the convex-concave portion of the bundling band 1 at that position is made to engage with the pawl portion 6a of the other pawl member 6 (the right one in the drawing) of the stopper 2, and an unnecessary portion of the bundling band 1 projecting over the stopper 2 is cut off to thereby complete the working of bundling. FIG. 1 shows this state.

Figure 5A:
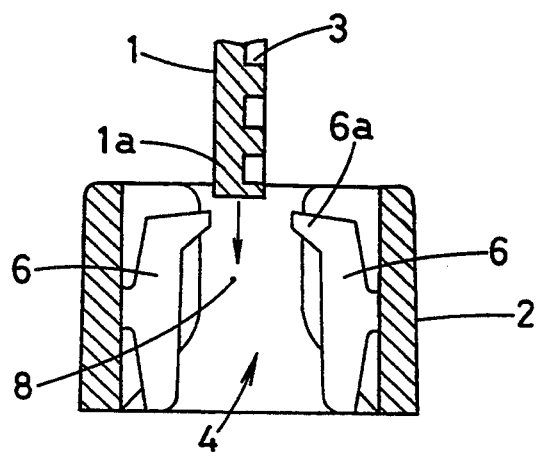
FIG. 5(a), 5(b) and 5(c) are sectional views illustrating the state in which the bundling band is in contact with the convex-concave portions.
Figure 5B:
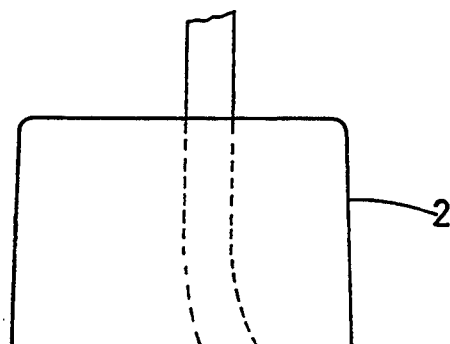
Figure 5C:
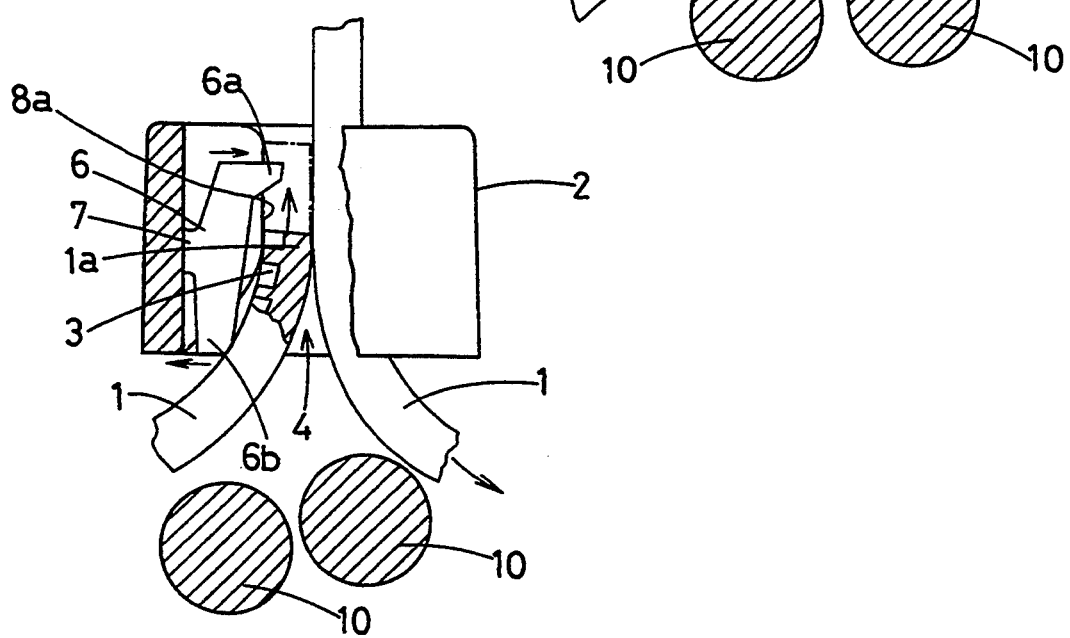

In the above working of bundling, more specifically, when the one end 1a of the bundling band 1 wound around the objects to be bundled is inserted again into the opening portion 4 of the stopper 2, the insertion is performed in the state where the leg portion 6b of the pawl member 6 (the left one in the diagram (c) of FIG. 5) is pushed outwards or towards the inner wall of the opening portion 4 in the direction as shown by an arrow in the diagram (c) of FIG. 5. Since the pawl member 6 is connected at its intermediate portion to the inner wall of the opening portion 4 through the connection portion 7, the pawl member 6 turns clockwise about the connection portion 7 when the leg portion 6b is pushed outwards. Thus, the pawl portion 6a comes down inwards in the direction as shown by an arrow in the diagram (c) of FIG. 5. The pawl portion 6a is therefore pushed more strongly against the convex-concave portion 3 of the bundling band 1 at the one end 1a inserted again so that the engagement between the bundling band 1 and the pawl member 6 becomes surer. Thereafter, the bundling band 1 is tightened so that the stopper 2 and the objects to be bundled 10, 10 . . . come adjacent to each other. The distance between the portions of the bundling band 1 at the exit of the opening portion 4 (lower end side in the drawing) is therefore widened so that the respective leg portions 6b and 6b of the pair of pawl members 6 and 6 are pushed outwards or towards the inner wall of the opening portion 4. Thus, the pair of pawl members 6 and 6 turn to make the respective pawl portions 6a and 6a come close to each other so that the respective pawl portions 6a and 6a of the pawl members 6 are pushed deeply against the convex-concave portions 3 of the bundling band 1. Thus, the engagement between the pawl members 6 and the bundling band 1 becomes stronger.

As has been described above, the bundling band 1 wound around the objects to be bundled 10, 10 . . . is inserted again into the stopper 2 and tightened so that the pawl members 6 turn to make the engagement with the bundling band 1 stronger naturally, and it is therefore not necessary to make the distance w1 between the respective top end pawl portions 6a and 6a of the pawl members 6 and 6 small in advance. When the bundling band 1 is inserted into the box-like opening portion 4 as shown in the diagram (a) of FIG. 5, accordingly, it is possible to make enough the distance between the bundling band 1 at its convex-concave portion 3 side and each pawl portion 6a, so that it is possible to perform the working of insertion easily. Further, the more strongly the bundling band 1 is tightened, the stronger the engagement between the pawl members 6 and the bundling band 1 is. It is therefore possible to bundle the objects to be bundled 10, 10 . . . surely and steadily.

Figure 6:
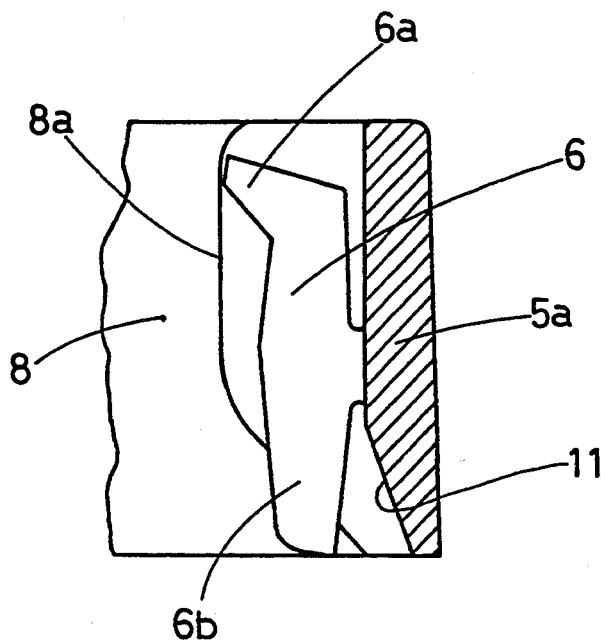
FIG. 6 is a sectional view illustrating a main portion of another embodiment of the stopper.

In the stopper, inner surfaces 11 of the opposite walls 5a facing the respective leg portions 6b of the pawl members 6 may be brought backward as shown in FIG. 6. Consequently the degree of turning of the pawl members 6 may be larger, so that it is possible to make the pawl portions 6a even to or back beyond the respective surfaces of the guide surfaces 8a of the guide grooves 8 to thereby make the working of insertion of the bundling band easier.

Figure 7:
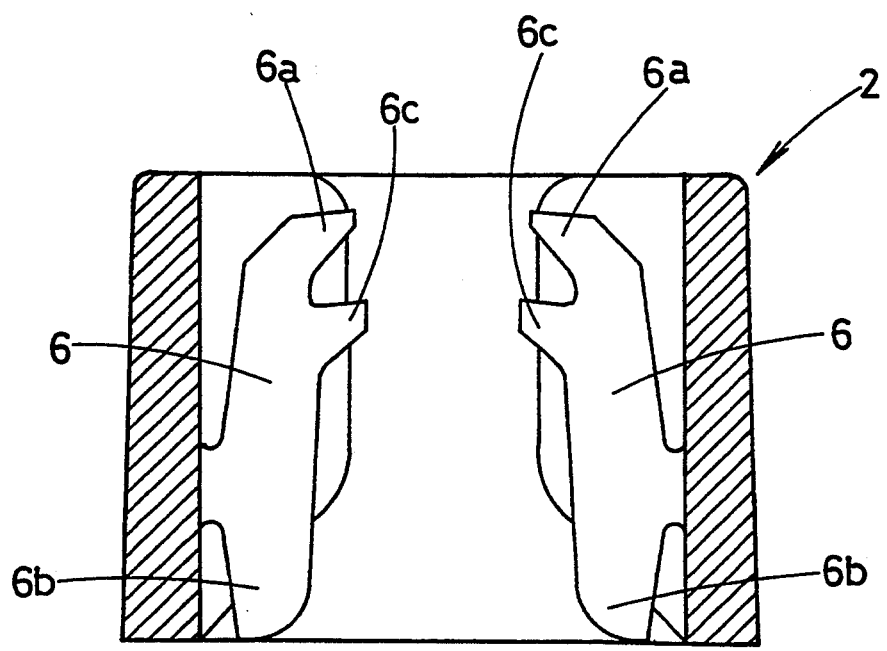
FIG. 7 is a sectional view illustrating a main portion of a further embodiment of the stopper.

Further, the number of pawl portions of each of the pawl members of the stopper is not limited to one. Two pawl portions 6a and 6c may be formed on each pawl member 6 as shown in FIG. 7. Alternatively, more than two pawl portions may be formed. It is preferable to form the pawl portion 6c so as to project inwards more than the the pawl portion 6a. When the pawl portion 6c engages with a convex-concave portion of the bundling band 1 first before the pawl portion 6a, the pawl member 6 turns so that the pawl portion 6a on the top end of the pawl member 6 comes inwards to engage with the bundling band 1. Thus, if the number of the pawl portions is increased, the engagement between the pawl members and the bundling band becomes stronger and it is possible to realize more steady bundling.

What is claimed is:

1. A binder for bundling electric wires or the like, comprising:

a long bundling band of synthetic resin for winding like a loop around objects to be bundled such as electric wires or the like to thereby bundle said objects and having on its surface a plurality of convex-concave portions formed like a rack; and a stopper of synthetic resin having a box-like opening portion through which two portions of said bundling band can be inserted with respective back surfaces of said two portions in contact, the stopper having inner opposite walls with guide surfaces for guiding the portions of the bundling band and further having a pair of pawl members formed on the inner opposite walls of said opening portion for engaging with said convex-concave portions of said bundling band inserted through said opening portion;

wherein substantially intermediate portions of said pair of pawl members are connected to said inner opposite walls of said box-like opening portion respectively, respective top ends of said pair of pawl members on one side of the intermediate portions are formed so as to engage with said convex-concave portions of said rack-shaped bundling band, respective leg portions of said pair of pawl members on a side of the intermediate portions opposite to the top ends project beyond the guide surfaces formed on said inner opposite walls and a space is formed between said leg portions and said inner walls to allow said pawl member to pivot about the intermediate portion.

2. A binder for bundling electric wires or the like according to claim 1, in which each of said top ends of said pair of pawl members has at least one pawl portion formed so as to engage with said convex-concave portions of said rack-shaped bundling band.

3. A binder for bundling electric wires or the like according to claim 1, in which each of said top ends of said pair of pawl members has two pawl portions formed so as to engage with said convex-concave portions of said rack-shaped bundling band.

4. The binder of claim 1, wherein said two portions of said bundling band engage said leg portions of said pawl members and urge said leg portions outward toward said inner walls of said stopper.

* * * * *